US008570966B2

(12) United States Patent  
Morimoto et al.

(10) Patent No.: US 8,570,966 B2  
(45) Date of Patent: Oct. 29, 2013

(54) BASE STATION, MOBILE STATION AND FREQUENCY DIVISION MULTIPLEXING COMMUNICATION METHOD

(75) Inventors: Akihito Morimoto, Yokohama (JP); Yoshihisa Kishiyama, Yokosuka (JP); Nobuhiko Miki, Yokohama (JP); Motohiro Tanno, Yokohama (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 299 days.

(21) Appl. No.: 12/989,577

(22) PCT Filed: Apr. 16, 2009

(86) PCT No.: PCT/JP2009/057694  
§ 371 (c)(1),  
(2), (4) Date: Jan. 10, 2011

(87) PCT Pub. No.: WO2009/133775  
PCT Pub. Date: Nov. 5, 2009

(65) Prior Publication Data  
US 2011/0103366 A1    May 5, 2011

(30) Foreign Application Priority Data  
Apr. 28, 2008   (JP) .................................. 2008-117877

(51) Int. Cl.  
*H04W 4/00* (2009.01)  
*H04B 7/208* (2006.01)  
*H04L 12/28* (2006.01)  
*H04W 72/04* (2009.01)  
*H04W 84/04* (2009.01)  
*H04L 5/00* (2006.01)

(52) U.S. Cl.  
CPC ............ *H04W 72/04* (2013.01); *H04W 84/042* (2013.01); *H04L 5/0007* (2013.01)  
USPC ............................. 370/329; 370/344; 370/431

(58) Field of Classification Search  
USPC ................. 370/328, 329, 343, 344, 431, 432, 370/464–466  
See application file for complete search history.

(56) References Cited

U.S. PATENT DOCUMENTS

| 2007/0189289 A1* | 8/2007 | Frederiksen et al. ......... 370/390 |
| 2008/0175264 A1* | 7/2008 | Qu et al. ...................... 370/436 |
| 2009/0190516 A1* | 7/2009 | Fukuoka et al. .............. 370/312 |

FOREIGN PATENT DOCUMENTS

| JP | 2007-194867 A |   | 8/2007 |
| JP | 2007-221277 A |   | 8/2007 |
| JP | 2007-300192 A |   | 11/2007 |
| JP | 2007300503 A  | * | 11/2007 |
| WO | 2007/052921 A1 |  | 5/2007 |

OTHER PUBLICATIONS

Machine Translation of JP2007-221277.*  
Machine Translation of JP2007-300503.*

(Continued)

*Primary Examiner* — Paul H Masur  
(74) *Attorney, Agent, or Firm* — Osha Liang LLP

(57) ABSTRACT

Provided is a base station comprising a multiplexer so constituted as to frequency-divide/multiplex a first channel for transmitting first data to be transmitted to a plurality of mobile stations, and a second channel for transmitting second data to be transmitted to one mobile station.

9 Claims, 13 Drawing Sheets

(56) References Cited

OTHER PUBLICATIONS

Patent Abstracts of Japan, Publication No. 2007-194867 dated Aug. 2, 2007, 1 page.
Patent Abstracts of Japan, Publication No. 2007-221277, dated Aug. 30, 2007, 1 page.
Patent Abstracts of Japan, Publication No. 2007-300192, dated Nov. 15, 2007, 1 page.
3GPP TS 36.300 V8.4.0, Mar. 2008, "Evolved Universal Terrestrial Radio Access (E-UTRA) and Evolved Universal Terrestrial Radio Access Network (E-UTRAN); Overall description; Stage 2 (Release 8)", 126 pages.
International Search Report issued in PCT/JP2009/057649, mailed on Jul. 14, 2009, with translation, 11 pages.
Written Opinion issued in PCT/JP2009/057649, mailed on Jul. 14, 2009, 7 pages.
Japanese Office Action for Application No. 2008-117877, mailed on Jul. 24, 2012 (4 pages).
LG Electronics, "Multiplexing of multi-cell MBMS and unicast transmission", 3GPP TSG RAN WG1#44bis, R1-060917, Athens, Greece, Mar. 27-31, 2006.
Office Action for Chinese Application No. 200980123901.7 dated Jan. 29, 2013, with English translation thereof (14 pages).
3GPP TSG-RAN WG1 Meeting Ad Hoc LTE, Tdoc R1-060235; "Further Consideration on Multiplexing of Unicast and MBMS"; Huawei; Helsinki, Finland, Jan. 23-25, 2006 (4 pages).

\* cited by examiner

FIG.2
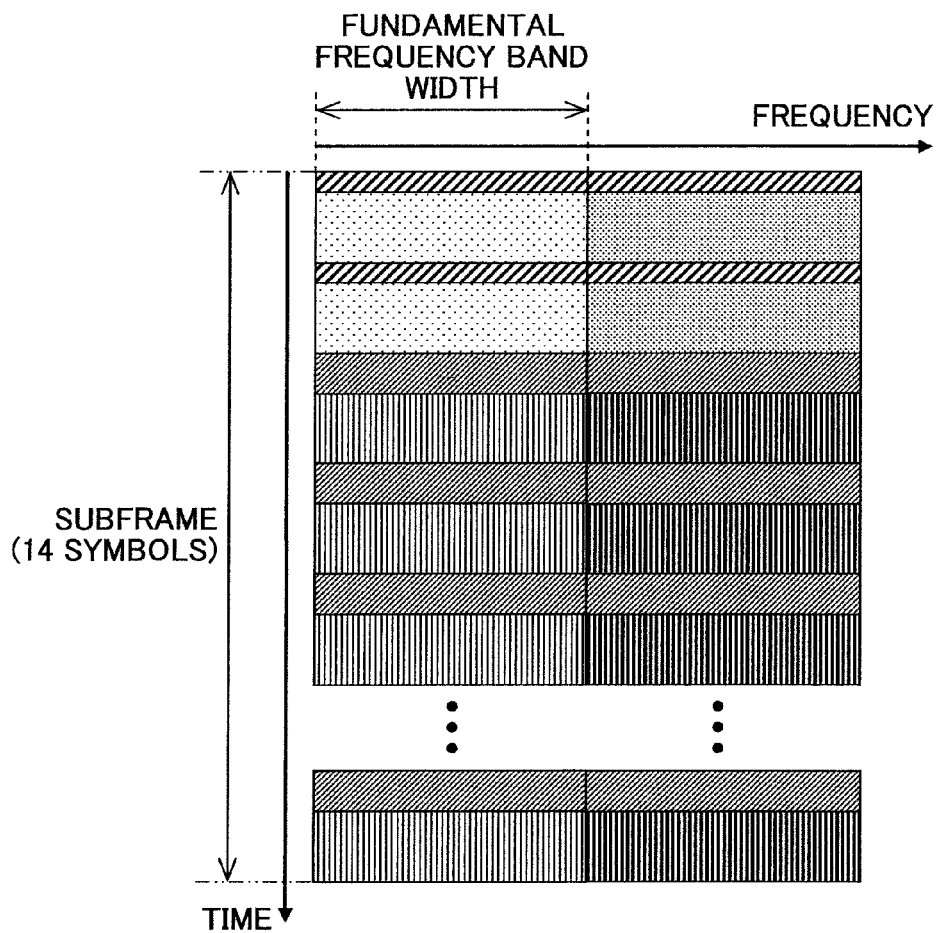
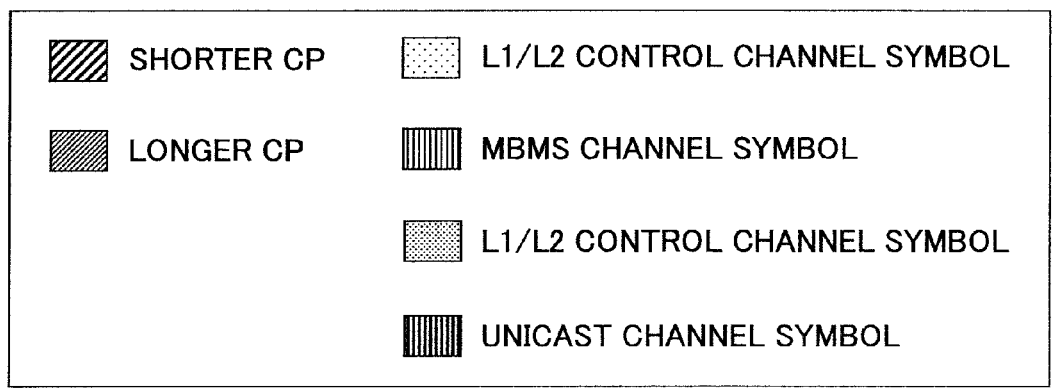

FIG.6
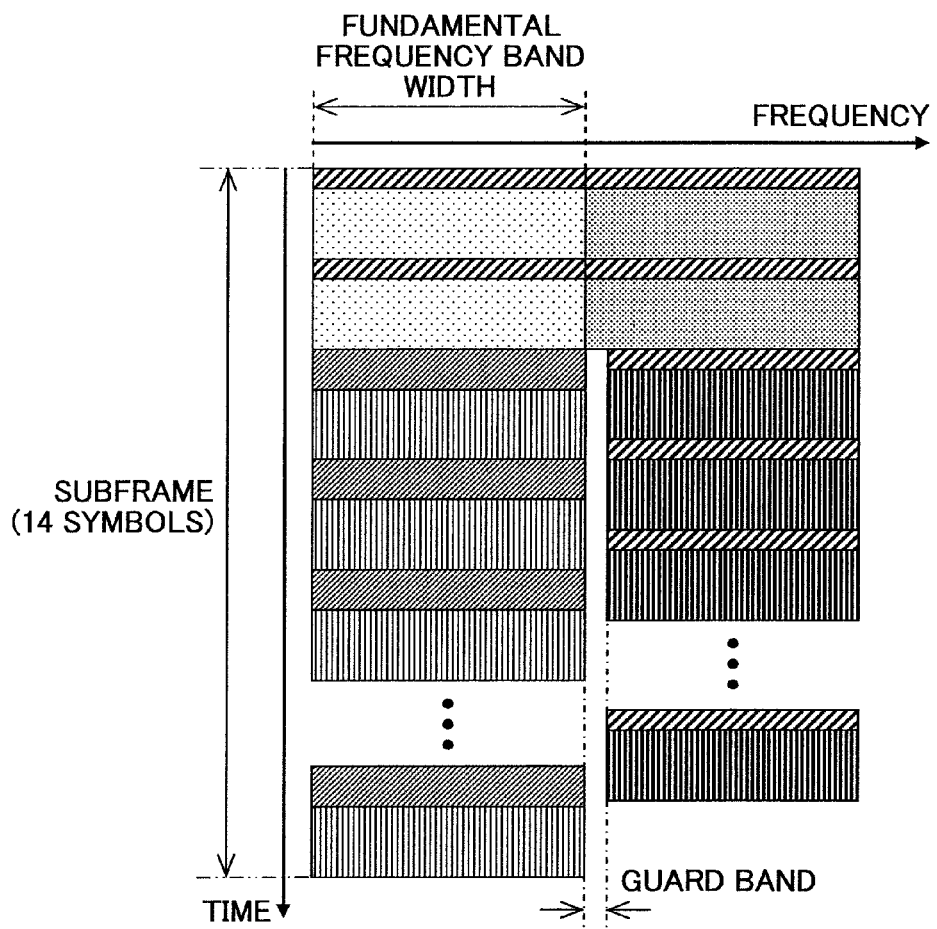
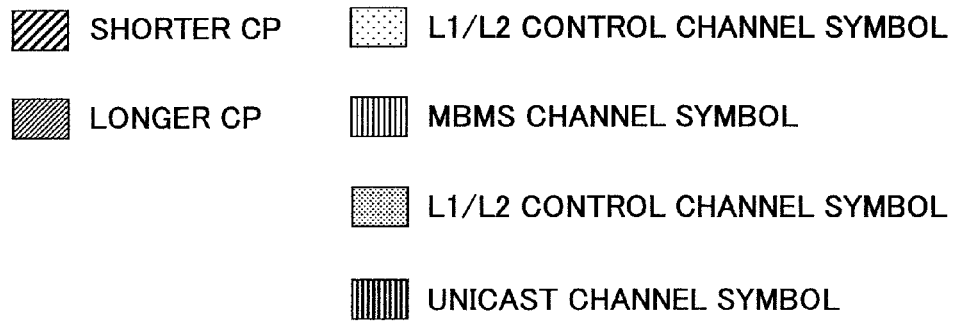

BASE STATION, MOBILE STATION AND FREQUENCY DIVISION MULTIPLEXING COMMUNICATION METHOD

This application is a national stage application of PCT/JP2009/057654 filed Apr. 16, 2009, which claims priority to Japanese Priority Application No. 2008-117877 filed on Apr. 28, 2008, the entire contents of which are hereby incorporated by reference.

TECHNICAL FIELD

The present invention relates to a base station, a mobile station and a frequency division multiplexing communication method.

BACKGROUND ART

Data communication between a base station and a mobile station is typically conducted in one-to-one communication, so-called unicast communication. On the other hand, there is multimedia broadcast/multicast service (MBMS) for transmitting the same data from a base station to multiple mobile stations simultaneously, which attracts attention due to support for broadcast message service and fast video streaming service.

In the MBMS, if the same MBMS data pieces are transmitted from multiple base stations, a mobile station can receive the MBMS data with a high quality by soft-combining the same MBMS data pieces from the multiple base stations (so-called MBSFN (MBMS with Single Frequency Network). In this case, the mobile station has to receive the MBMS data from the multiple base stations with a delay time period less than or equal to a cyclic prefix (CP), and a longer CP would be required in consideration of delay of the MBMS data from a far base station. For example, the CP for unicast communication corresponds to 69μ seconds in LTE (3.9 generation (3.9G)) while the CP corresponds to 16.67μ seconds in the MBMS. In this manner, if the unicast channel and the MBMS channel (shared data channel (SDCH)), which have different CP lengths, are frequency-multiplexed and transmitted, orthogonality between the respective channels cannot be ensured. For this reason, the unicast channel and the MBMS channel are time-multiplexed per subframe unit in the LTE.

RELATED ART DOCUMENT

Non-Patent Document

Non-patent document 1: 3GPP, TS 36.300, Evolved Universal Terrestrial Radio Access (E-UTRA) and Evolved Universal Terrestrial Radio Access Network (E-UTRAN); Overall description; Stage 2 (Release 8).

DISCLOSURE OF INVENTION

Problem to be Solved by the Invention

However, it is being discussed to use an extremely wide frequency band such as 100 MHz in IMT-Advanced (the fourth generation (4G)) to realize extremely high peak rates and throughputs, and it is inefficient and unreasonable that the unicast channel and the MBMS channel are multiplexed in accordance with only the time division multiplexing (TDM). Also, there is a need that a transmission manner of a L1/L2 control channel for the MBMS channel is reconsidered from the viewpoint of efficient utilization of radio resources.

The present invention addresses the above-mentioned problems and intends to provide a base station, a mobile station and a frequency division multiplexing communication method for the MBMS subframes and the unicast frames that realize efficient utilization of radio resources in MBMS and unicast communications.

Means for Solving the Problem

In order to realize the above objects, a first aspect of the present invention provides a base station comprising: a multiplexing unit configured to multiplex a first channel and a second channel in accordance with frequency division multiplexing, wherein the first channel is for transmitting first data to be transmitted to multiple mobile stations, and the second channel is for transmitting second data to be transmitted to one mobile station.

A second aspect of the present invention provides the base station of the first aspect, further comprising: a first signal generation unit configured to generate the first channel, the first signal generation unit inserting a first cyclic prefix to the first channel including the first data; and a second signal generation unit configured to generate the second channel, the second signal generation unit inserting a second cyclic prefix to the second channel including the second data, the second cyclic prefix having a same length as the first cyclic prefix.

A third aspect of the present invention provides the base station of the first aspect, further comprising: a third signal generation unit configured to generate the second channel, the third signal generation unit inserting a guard band between the second channel and the first channel.

A fourth aspect of the present invention provides the base station of any of the first through third aspects, wherein a L1/L2 control channel to be multiplexed in a frequency band for transmitting the first channel is multiplexed in a frequency band for transmitting the second channel.

A fifth aspect of the present invention provides a mobile station for communicating to the base station as claimed in any of the first through fourth aspects, comprising: a demultiplexing unit configured to demultiplex the first channel and the second channel multiplexed in accordance with the frequency division multiplexing.

A sixth aspect of the present invention provides a frequency division multiplexing communication method, comprising the steps of: generating a first channel for transmitting first data to be transmitted to multiple mobile stations; generating a second channel for transmitting second data to be transmitted to one mobile station; and multiplexing the first channel and the second channel in accordance with frequency division multiplexing.

A seventh aspect of the present invention provides the frequency division multiplexing communication method of the sixth aspect, wherein the step of generating the first channel comprises inserting a first cyclic prefix to the first channel, and the step of generating the second channel comprises inserting a second cyclic prefix to the second channel, the second cyclic prefix having a same length as the first cyclic prefix.

An eighth aspect of the present invention provides the frequency division multiplexing communication method of the sixth aspect, wherein the step of generating the second channel comprises inserting a guard band between the second channel and the first channel.

A ninth aspect of the present invention provides a base station for transmitting data to multiple mobile stations in N frequency bands, comprising: a control signal generation unit configured to generate a control signal for indicating one or less than N frequency bands for multiplexing a L1/L2 control channel among the N frequency bands used to transmit the data; and a signal generation unit configured to generate a channel including the data depending on the control signal.

A tenth aspect of the present invention provides a mobile station for communicating to the base station of the ninth aspect, comprising: a receiving unit configured to receive a signal from the base station; a demultiplexing unit configured to demultiplex the signal received from the receiving unit to extract identification information for identifying one or less than N frequency bands; and a data demodulation and decoding unit configured to obtain information in the L1/L2 control channel based on the identification information supplied from the demultiplexing unit.

An eleventh aspect of the present invention provides a frequency division multiplexing communication method for transmitting data to multiple mobile stations in N frequency bands, comprising the steps of: indicating one or less than N frequency bands for multiplexing a L1/L2 control channel among the N frequency bands used to transmit the data; and generating a subframe including the data depending on a control signal.

Advantage of the Invention

According to the aspects of the present invention, it is possible to provide a base station, a mobile station and a frequency division multiplexing communication method for the MBMS subframes and the unicast frames that realize efficient utilization of radio resources in MBMS and unicast communications.

BRIEF DESCRIPTION OF DRAWINGS

FIG. 2 illustrates MBMS channels and unicast channels that are frequency-division-multiplexed at a base station according to the first embodiment of the present invention;

FIG. 6 illustrates MBMS channels and unicast channels that are frequency-division-multiplexed at a base station according to the second embodiment of the present invention;

DETAILED DESCRIPTION OF EMBODIMENTS

Embodiments of the present invention are described with reference to the drawings below. In the following descriptions, the same or similar reference symbols are attached to the same or similar arrangements, and descriptions thereof are omitted.

First Embodiment

Figure 1:
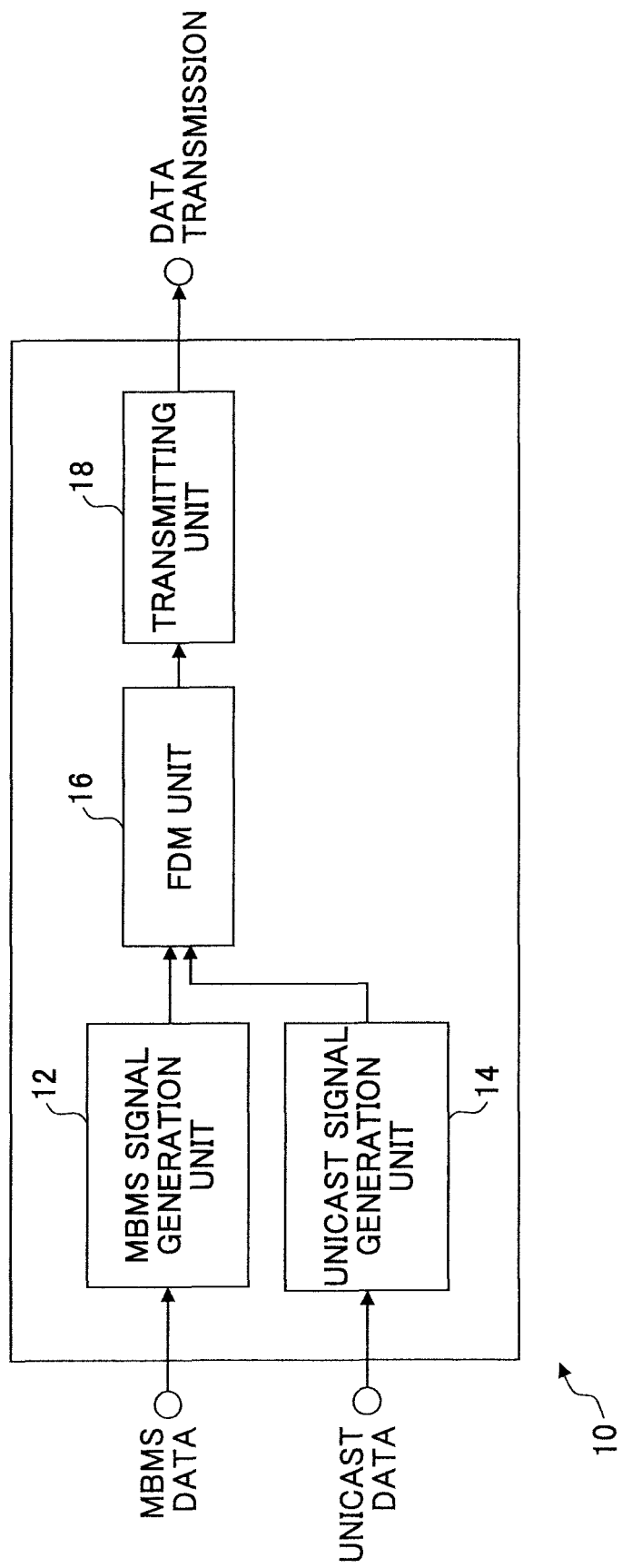
FIG. 1 is a schematic view illustrating an arrangement of a base station according to a first embodiment of the present invention.

The first embodiment of the present invention is described with reference to FIGS. 1-4.
[Base Station]
FIG. 1 is a schematic view illustrating an arrangement of a base station according to the first embodiment of the present invention. As illustrated, a base station 10 includes a MBMS signal generation unit 12, a unicast signal generation unit 14, a frequency division multiplexing (FDM) unit 16 and a transmitting unit 18.

The MBMS signal generation unit 12 fetches data to be transmitted to multiple mobile stations (MBMS data) from a non-illustrated buffer, modulates the fetched MBMS data and L1/L2 control information in accordance with an orthogonal frequency division multiplexing (OFDM) scheme and attaches a cyclic prefix (referred to as a CP hereinafter) OFDM symbol-by-OFDM symbol to generate a MBMS channel. Here a relatively long CP is attached to a MBMS data symbol. This is because delay from the multiple base stations 10 can be accommodated within the CP under the case where the multiple base stations 10 transmit the same data and a mobile station receives the same data from the multiple base stations 10. Specifically, the CP may have the length of, but not limited to, 16.67µ second, for example. On the other hand, the attached CP corresponding to the L1/L2 control information may be shorter than the CP attached to the MBMS data symbol (e.g., 4.69µ second). In the following description, the CP attached to the L1/L2 control information symbol is referred to as "shorter CP" while the CP attached to the MBMS data symbol is referred to as "longer CP". Note that the L1/L2 control channel may include scheduling information, uplink feedback information for uplink transmission from the mobile station to the base station 10 (information such as frequency bands to be utilized for the uplink transmissions), information on a modulation coding set (MCS) and information indicative of a reception result of the uplink transmission (ACK, NACK).

Also, the MBMS signal generation unit 12 supplies the MBMS channel as generated in the above manner to the FDM unit 16.

The unicast signal generation unit 14 fetches data to be transmitted to any mobile station (unicast data) from a non-illustrated buffer, modulates the fetched data and the L1/L2 control information in accordance with the OFDM and attaches the CP OFDM symbol-by-OFDM symbol to generate the unicast channel. Here, a longer CP is attached to the unicast data symbol similar to the above-mentioned MBMS data. The unicast communication is one-to-one communication between the base station 10 and any mobile station, and due to no need of considering signal delay from multiple base stations, it can be said that it may be sufficient to attach a shorter CP to the unicast data symbol. In the base station 10 according to the first embodiment, however, a longer CP is also attached to the unicast data symbol. Also, a shorter CP is attached to the L1/L2 control information symbol. Also, the unicast signal generation unit 14 supplies the unicast channel as generated in the above manner to the FDM unit 16.

The FDM unit 16 receives the MBMS channel from the MBMS signal generation unit 12 and the unicast channel from the unicast signal generation unit 14. The FDM unit 16 multiplexes the received MBMS channel and unicast channel in the frequency division multiplexing manner to generate a transmission signal. FIG. 2 illustrates an exemplary transmission signal. Referring to FIG. 2, the MBMS channels and the unicast channels, which have a mutually equal fundamental frequency width (for example, but not limited to, 50 MHz), are arranged in the frequency axis direction. Also, as illustrated, shorter CPs are attached to the L1/L2 control information symbols (consisting of two symbols in the illustrated example) for both frequency bands for transmitting the MBMS channels and the unicast channels, and the resulting data is transmitted. On the other hand, longer CPs are attached to the MBMS channel symbols and the unicast channel symbols.

Although FIG. 2 illustrates the case where the MBMS channel and the unicast channel have the mutually equal frequency bandwidth, different frequency bandwidths may be utilized.

Referring to FIG. 1 again, the FDM unit 16 provides the transmitting unit 18 with a transmission signal resulting from frequency division multiplexing of the MBMS channels and the unicast channels. Upon receiving the transmission signal, the transmitting unit 18 performs predefined operations on the transmission signal and transmits the resulting transmission signal via a non-illustrated antenna.

[Mobile Station]

Figure 3:
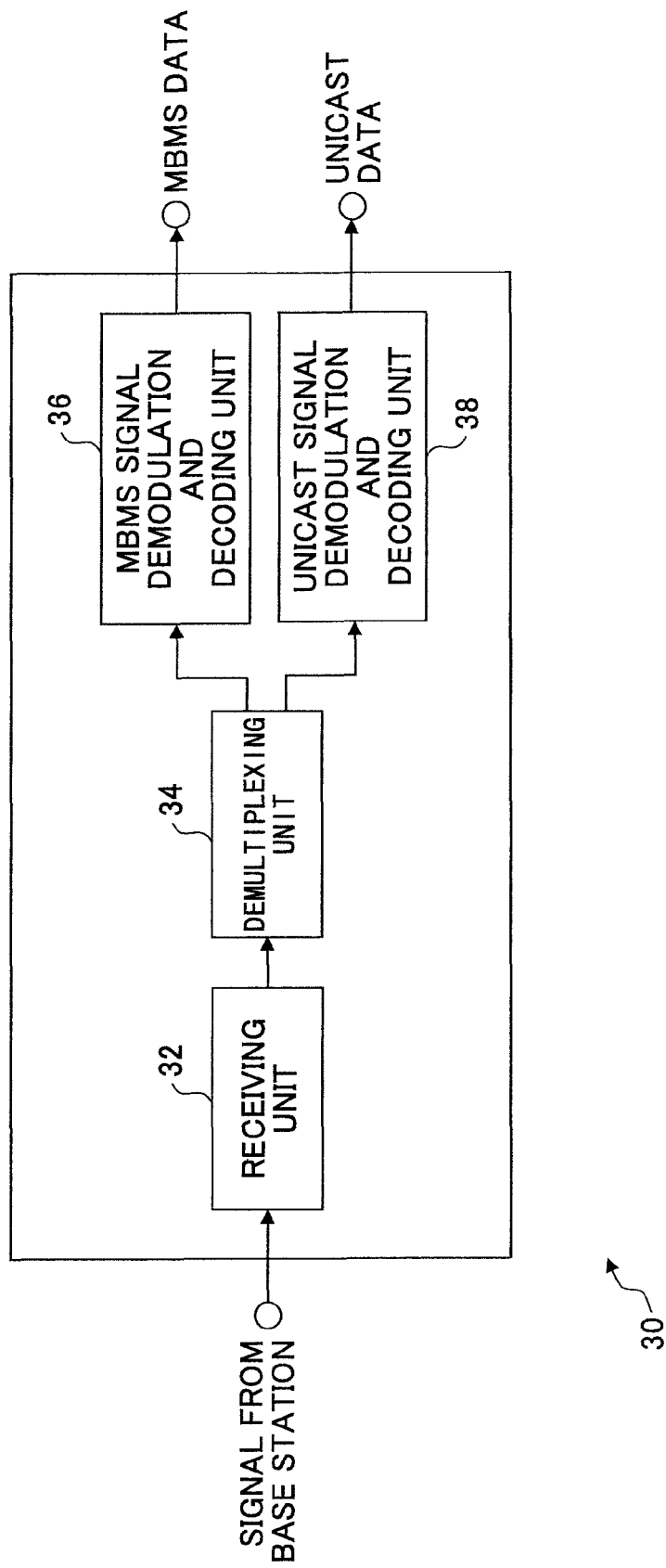
FIG. 3 is a schematic view illustrating an arrangement of a mobile station according to the first embodiment of the present invention.

FIG. 3 is a schematic view illustrating an arrangement of a base station according to the first embodiment of the present invention. As illustrated, a mobile station 30 includes a receiving unit 32, a demultiplexing unit 34, a MBMS signal demodulation and decoding unit 36 and a unicast signal demultiplexing and decoding unit 38.

The receiving unit 32 receives a transmission signal from the base station 10, performs predefined operations on the received signal and supplies the resulting signal to the demultiplexing unit 34.

The demultiplexing unit 34 demultiplexes the signal received from the receiving unit 32 into the MBMS channels and the unicast channels. For demultiplexing into the MBMS channels and the unicast channels, the mobile station 30 has to comprehend a frequency band used to transmit the MBMS channel and a frequency band used to transmit the unicast channel. To this end, information on the frequency bands is indicated from the base station 10 to the mobile station 30. The indication may be conducted through upper layer (L3) signaling in connection to the base station 10, through a broadcast channel to all the mobile stations 30 residing within a cell of the base station 10 or by transmitting the L1/L2 control channel having the multiplexed frequency band information to a certain one or some of the base stations 30. The indication through the upper layer signaling is preferred under the case where the used frequency bands are changed relatively infrequently (for example, the case where the frequency bands are unchanged after initiation of communication), and the indication through the broadcast channel is preferred under the case where the used frequency bands are changed relatively frequently. Also, the indication by multiplexing into the L1/L2 control channel is preferred under the case where the used frequency bands may be changed for each transmission, for example.

Also, the demultiplexing unit 34 supplies the demultiplexed MBMS channels and unicast channels to the MBMS signal demodulation and decoding unit 36 and the unicast signal demodulation and decoding unit 38, respectively. The MBMS signal demodulation and decoding unit 36 performs predefined operations on the MBMS channels received from the demultiplexing unit 34 to demodulate and decode the MBMS channels. The unicast signal demodulation and decoding unit 38 performs predefined operations on the unicast channels received from the demultiplexing unit 34 to demodulate and decode the unicast channels.

[Frequency Division Multiplexing Communication Method]

Figure 4:
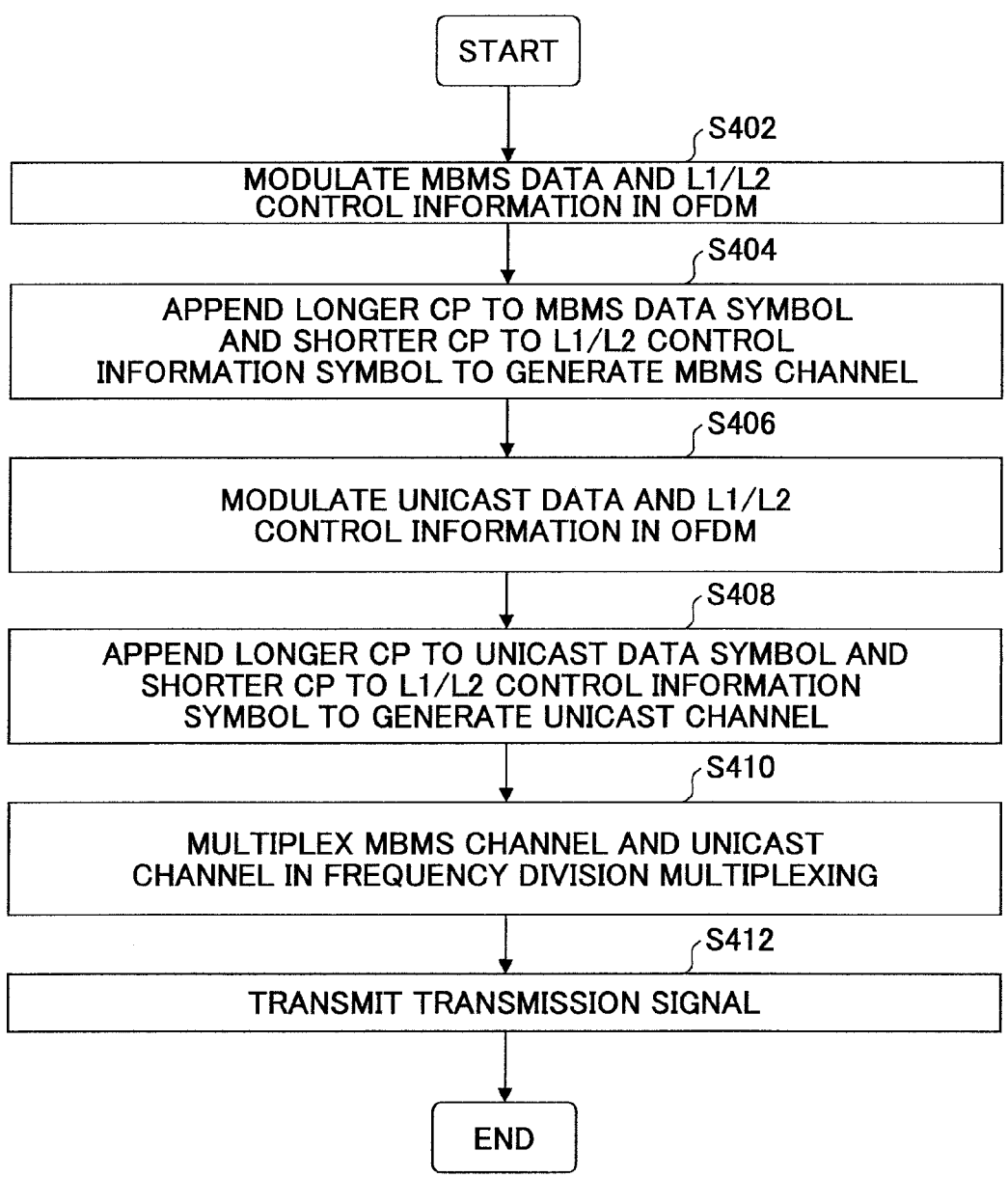
FIG. 4 is a flowchart illustrating a frequency division multiplexing communication method according to the first embodiment of the present invention.

A frequency division multiplexing communication method for the MBMS channels and the unicast channels according to the first embodiment of the present invention is described with reference to FIG. 4. FIG. 4 is a flowchart illustrating the frequency division multiplexing communication method according to the first embodiment. Referring to FIG. 4, the MBMS data and the L1/L2 control information are modulated in accordance with the OFDM at step S402. At step S404, in order to generate the MBMS channel, longer CPs are attached to the MBMS data symbols, and shorter CPs are attached to the L1/L2 control information symbols.

Next, the unicast data and the L1/L2 control information are modulated in accordance with the OFDM at step S406. At step S408, in order to generate the unicast channel, longer CPs are attached to the unicast data symbols, and shorter CPs are attached to the L1/L2 control information symbols. Then, the MBMS channel generated at step S404 and the unicast channel generated at step S408 are multiplexed in the frequency division multiplexing manner at step S410, and the resulting transmission signal is transmitted at step S412.

In the above-mentioned embodiment, steps S402 and S404 precede steps S406 and S408, but steps S406 and S408 may be conducted earlier than steps S402 and S404. Alternatively, steps S402 and S404 may be performed approximately in synchronous with steps S406 and S408.

In this manner, according to the first embodiment, the CP having the same length as the CP inserted to the MBMS channel is inserted to the unicast channel, and the unicast channel and the MBMS channel are multiplexed in the frequency division multiplexing manner. As a result, it is possible to maintain the orthogonality between the channels. In other words, the insertion of the longer CP into the unicast channel can realize the unicast communication and the MBMS communication in accordance with the frequency division multiplexing. For this reason, radio resources can be efficiently utilized compared with the case where the unicast communication and the MBMS communication are made in accordance with the time division multiplexing. Particularly, the IMT-Advanced allows for utilization of a wide frequency band, and accordingly by using the wide frequency band, the MBMS communication and the unicast communication are conducted in different frequency bands, which can provide smooth services such as fast video streaming.

Second Embodiment

Figure 7:
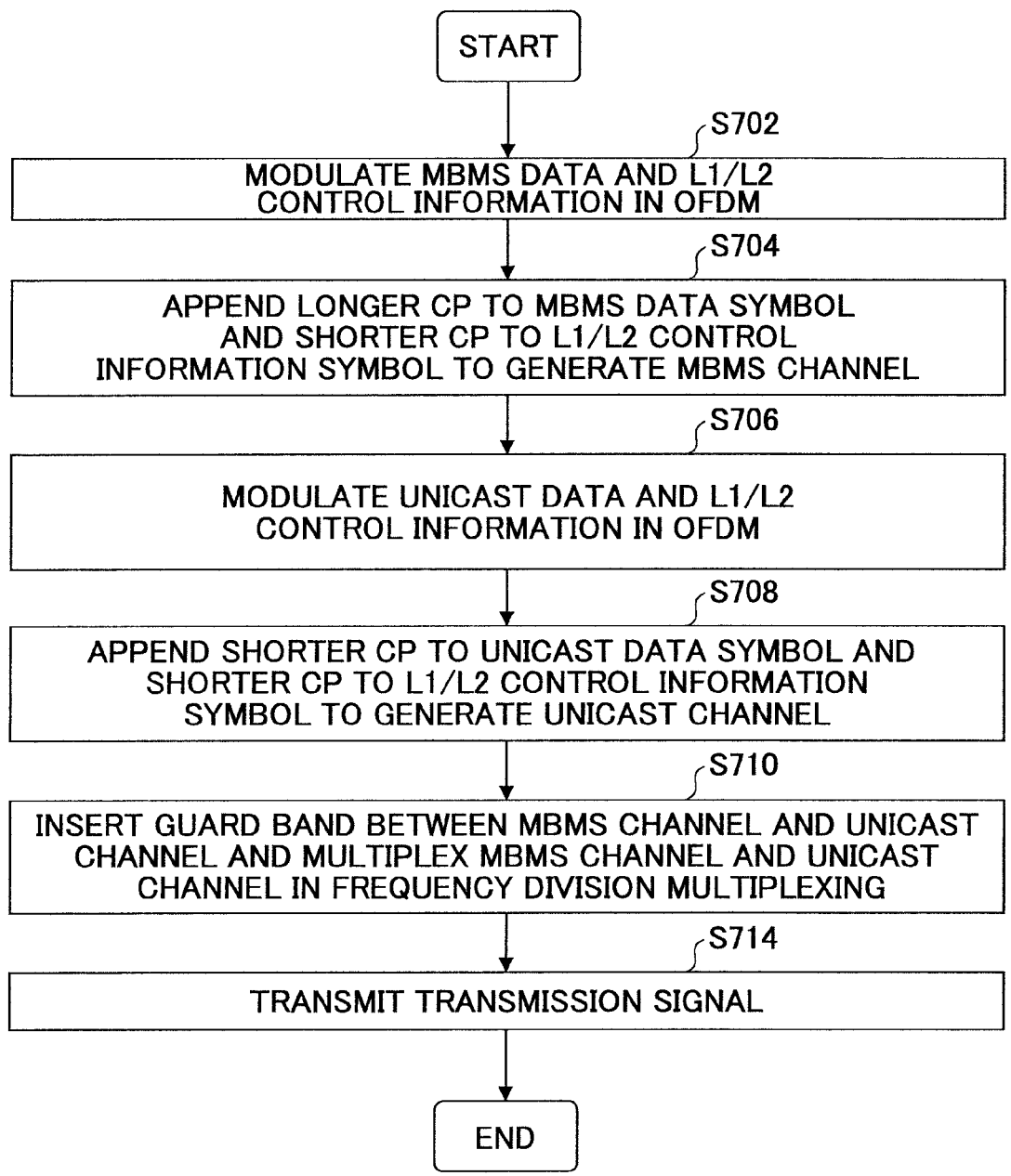
FIG. 7 is a flowchart illustrating a frequency division multiplexing communication method according to the second embodiment of the present invention.

The second embodiment of the present invention is described with reference to FIGS. 5-7.

[Base Station]

Figure 5:
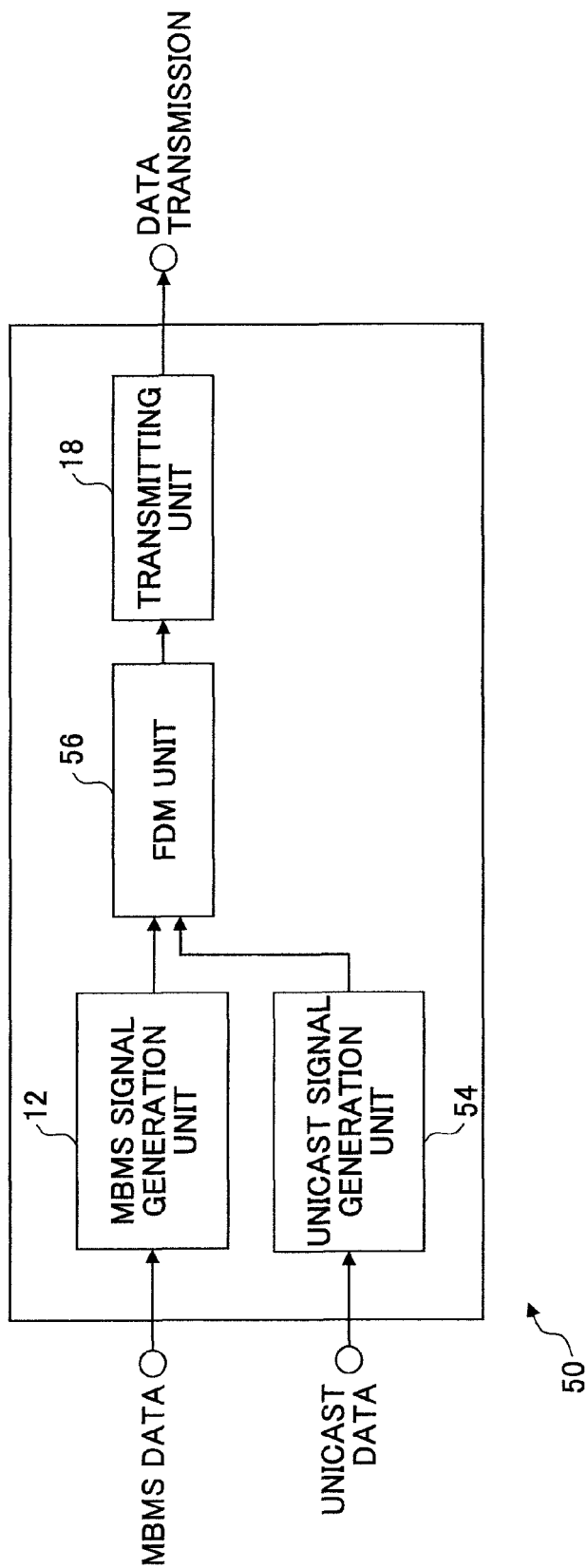
FIG. 5 is a schematic view illustrating an arrangement of a base station according to a second embodiment of the present invention.

FIG. 5 is a schematic view illustrating an arrangement of a base station according to the second embodiment of the present invention. As illustrated, a base station 50 includes a MBMS signal generation unit 12, a unicast signal generation unit 54, a FDM unit 56 and a transmitting unit 18.

The MBMS signal generation unit 12 generates a MBMS channel in the same manner as the MBMS signal generation unit 12 of the base station 10 according to the first embodiment and supplies the generated MBMS channel to the FDM unit 56.

The unicast signal generation unit 54 fetches unicast data to be transmitted to any mobile station from a non-illustrated buffer, modulates the fetched data and L1/L2 control information in accordance with the OFDM and appends a CP to each OFDM symbol to generate a unicast channel. Unlike the first embodiment, in the second embodiment, the CP inserted by the unicast signal generation unit 54 to the unicast channel is a shorter CP. The unicast communication is one-to-one communication between the base station 10 and any mobile station, and due to unnecessary consideration of data delay from multiple base stations, it is sufficient to append the shorter CP to the unicast data symbol. Also, the shorter CP is appended to the L1/L2 control information symbol. This is the same as the first embodiment.

Also, the unicast signal generation unit 54 supplies the generated unicast channel to the FDM unit 56.

The FDM unit 56 receives the MBMS channel from the MBMS signal generation unit 12 and the unicast channel from the unicast signal generation unit 54. In the case where the unicast channel having the shorter CPs appended to the symbols corresponding to the unicast data and the MBMS channel having the appended longer CPs are directly multiplexed in accordance with the frequency division multiplexing manner, there may be a risk that the orthogonality cannot be maintained. For this reason, the FDM unit 56 provides a guard band between the unicast channel and the MBMS channel and multiplexes the unicast channel and the MBMS channel in accordance with the frequency division multiplexing manner to generate a transmission signal. FIG. 6 illustrates an exemplary transmission signal. Referring to FIG. 6, the MBMS channel and the unicast channel are aligned in the frequency axis direction. Also as illustrated, shorter CPs are appended to L1/L2 control symbols (consisting of two symbols in the illustrated example) in both the MBMS channel and the unicast channel, and the longer CPs are appended to the MBMS channel symbols while the shorter CPs are appended to the unicast channel symbols. Furthermore, a guard band is inserted between the unicast channel and the MBMS channel. Due to this guard band, the MBMS channel and the unicast channel will have the same frequency bandwidth.

However, the guard band may be inserted between the MBMS channel and the unicast channel such that the MBMS channel and the unicast channel can have different frequency bandwidths.

Referring to FIG. 5 again, the FDM unit 56 supplies the transmission signal generated in accordance with the frequency division multiplexing to the transmitting unit 18. Upon receiving the transmission signal, the transmitting unit 18 performs predefined operations on the transmission signal and transmits the resulting signal via a not-illustrated antenna.

[Mobile Station]

The mobile station communicating to the base station 50 according to the second embodiment of the present invention may have the same arrangement as the mobile station 30 according to the first embodiment. Also, without modification of the method for indicating information on frequency bands for use in transmissions of the MBMS channel and the unicast channel, which is necessary to separate the MBMS channel from the unicast channel, the frequency band information may be indicated through upper layer (L3) signaling in connection of the mobile station to the base station 50. Alternatively, the frequency band information may be indicated to all mobile stations residing within a cell of the base station 50 in a broadcast channel. Alternatively, the frequency band information may be multiplexed into a L1/L2 control channel, and the L1/L2 control channel may be transmitted to a certain one or all of the mobile stations.

The demultiplexing unit 34 of the mobile station according to the second embodiment can separate the unicast channel based on the indicated frequency band information for use in the unicast channel transmission. Accordingly, the FDM unit 56 of the base station 50 does not have to comprehend the width of the guard band between the unicast channel and the MBMS channel.

[Frequency Division Multiplexing Communication Method]

A frequency division multiplexing communication method for the MBMS channel and the unicast channel according to the second embodiment of the present invention is described with reference to FIG. 7. FIG. 7 is a flowchart illustrating the frequency division multiplexing communication method according to the second embodiment. Referring to FIG. 7, MBMS data and L1/L2 control information are modulated in accordance with the OFDM at step S702. At step S704, longer CPs are appended to the MBMS data symbols, and shorter CPs are appended to the L1/L2 control information symbols to generate the MBMS channel.

Then, the unicast data and the L1/L2 control information are modulated in accordance with the OFDM at step S706. At step S708, shorter CPs are appended to the unicast data symbols, and shorter CPs are appended to the L1/L2 control information symbols to generate the unicast channel. Then, at step S710, a guard band is provided between the unicast channel and the MBMS channel, and these channels and the guard band are multiplexed in the frequency division multiplexing manner to generate a transmission signal. The transmission signal is transmitted at step S714.

According to the second embodiment, the guard band is provided between the unicast channel and the MBMS channel, and the unicast channel and the MBMS channel are multiplexed in accordance with the frequency division multiplexing manner. Accordingly, it is possible to maintain the orthogonality between the channels. In other words, the unicast communication and the MBMS communication can be realized with the frequency division multiplexing through the appended guard band. As a result, radio resources can be efficiently utilized compared to the case where the unicast communication and the MBMS communication are based on only time division multiplexing. Particularly, a wide frequency band is available in the IMT-Advanced, and thus services such as fast video streaming can be smoothly provided by using the wide frequency band to perform the MBMS communication and the unicast communication in different frequency bands. Furthermore, the insertion of the guard band makes it possible to use optimum CPs in the unicast channel, and accordingly the optimum CPs can be used for both the MBMS channel and the unicast channel.

Third Embodiment

The third embodiment of the present invention is described with reference to FIGS. 8-10.

[Base Station]

Figure 8:
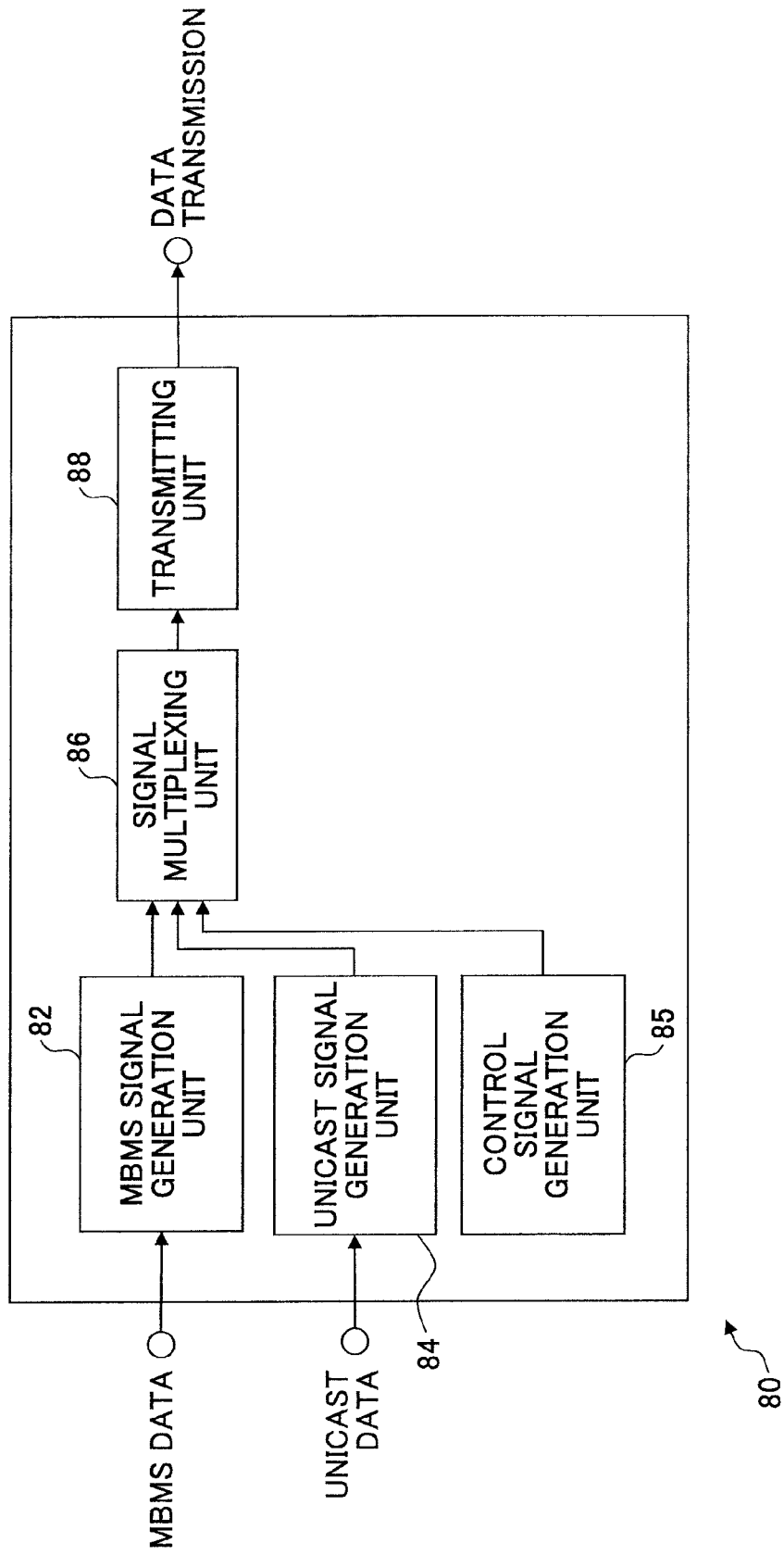
FIG. 8 is a schematic view illustrating an arrangement of a base station according to a third embodiment of the present invention.
Figure 9:
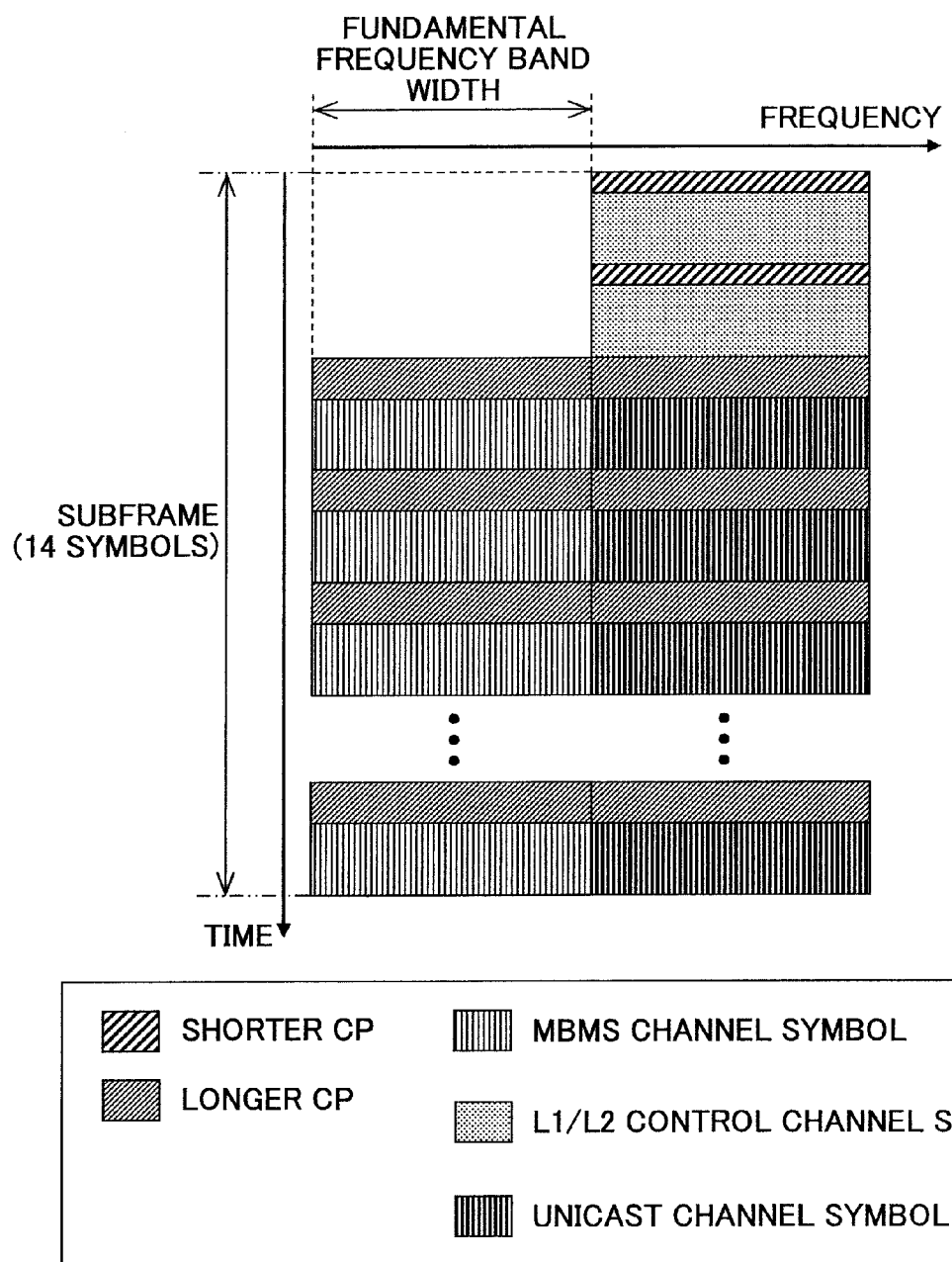
FIG. 9 is a schematic view illustrating an exemplary arrangement of the MBMS channels generated at a base station according to the third embodiment of the present invention.

FIG. 8 is a schematic view illustrating an arrangement of a base station according to the third embodiment of the present invention. As illustrated, a base station 80 includes a MBMS signal generation unit 82, a unicast signal generation unit 84, a L1/L2 control signal generation unit 85, a signal multiplexing unit 86 and a transmitting unit 88.

The MBMS signal generation unit 82 fetches MBMS data from a non-illustrated buffer, modulates the fetched MBMS data in accordance with the OFDM, and appends a longer CP to each OFDM symbol to generate a MBMS channel. Also, the MBMS signal generation unit 82 supplies the generated MBMS channel to the signal multiplexing unit 86.

The unicast signal generation unit 84 fetches unicast data from a non-illustrated buffer, modulates the fetched data in accordance with the OFDM, and appends a CP to each OFDM symbol to generate a unicast channel. Here, the longer CPs are appended to the unicast data symbols as in the above-mentioned MBMS data. Also, the above L1/L2 control information includes not only information necessary for feedback for uplink transmission for reply to reception of the unicast channel from a mobile station at the base station but also reception acknowledgement information (ACK/NACK) transmitted from the base station 80 to the mobile station.

The unicast signal generation unit 84 supplies the generated unicast channel to the signal multiplexing unit 86.

The L1/L2 control signal generation unit 85 generates a L1/L2 control signal such as feedback information on the uplink transmission (ACK/NACK, scheduling information, MCS information and so on) and control information for downlink unicast transmission (MCS information, transmission assigned user information and so on) and supplies the generated L1/L2 control signal to the signal multiplexing unit 86.

The signal multiplexing unit 86 receives the MBMS channel from the MBMS signal generation unit 82, the unicast channel from the unicast signal generation unit 84 and the control signal regarding the L1/L2 control information from the L1/L2 control signal generation unit 85. The signal multiplexing unit 86 performs mapping on the received channels and signal to generate a transmission signal. FIG. 9 illustrates an exemplary transmission signal. Referring to FIG. 9, the MBMS channel and the unicast channel having the same fundamental frequency bandwidth are aligned in the frequency axis direction. Also as illustrated, the portion corresponding to the L1/L2 control channel in the MBMS channel has no information (unused). As described in conjunction with the first and second embodiments, the MBMS channel and the unicast channel do not have to have the same frequency bandwidth and may have different frequency bandwidths.

Referring to FIG. 8 again, the signal multiplexing unit 86 supplies the generated transmission signal to the transmitting unit 88. Upon receipt of the transmission signal, the transmitting unit 88 performs predefined operations on the transmission signal and transmits the resulting signal via a non-illustrated antenna.

[Mobile Station]

Figure 10:
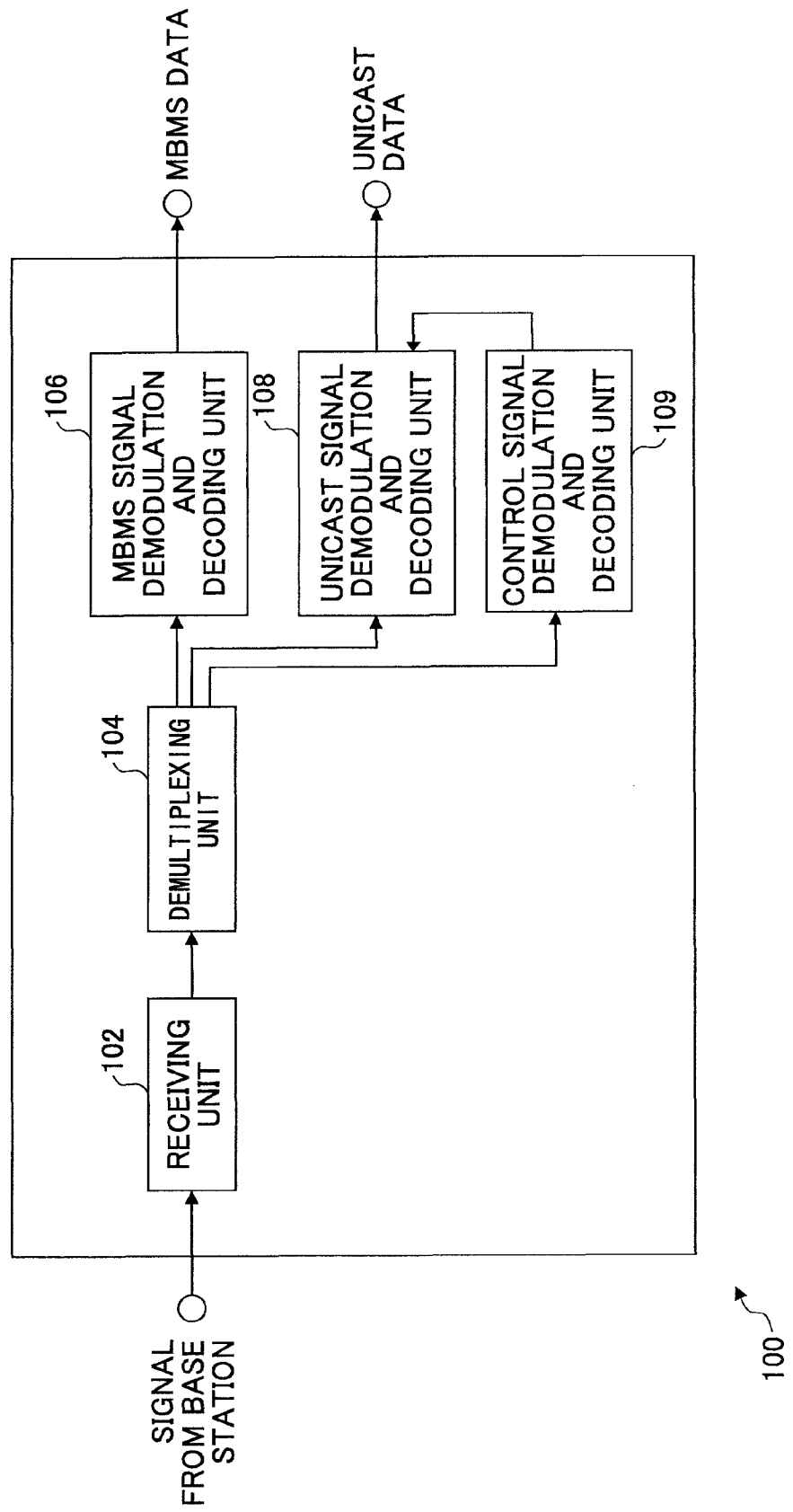
FIG. 10 illustrates the MBMS channels and the unicast channels that are frequency-division-multiplexed at a base station according to a third embodiment of the present invention.

FIG. 10 is a schematic view illustrating an arrangement of a mobile station according to the third embodiment of the present invention. As illustrated, a mobile station 100 includes a receiving unit 102, a demultiplexing unit 104, a MBMS signal demodulation and decoding unit 106, a unicast signal demodulation and decoding unit 108 and a control signal demodulation and decoding unit 109.

The receiving unit 102 receives a transmission signal transmitted from the base station 100, performs predefined operations on the received signal and supplies the resulting signal to the demultiplexing unit 104.

The demultiplexing unit 104 demultiplexes the signal received from the receiving unit 102 into a MBMS signal, a unicast signal and a L1/L2 control signal. Also, the demultiplexing unit 104 supplies the MBMS signal to the MBMS signal demodulation and decoding unit 106, the unicast signal to the unicast signal demodulation and decoding unit 108 and the L1/L2 control signal to the control signal demodulation and decoding unit 109.

The control signal demodulation and decoding unit 109 obtains a control signal regarding the L1/L2 control information (control information for downlink unicast transmission (MCS information, transmission assigned user information and so on), feedback information for uplink transmission and so on) from the control signal supplied from the demultiplexing unit 104 and supplies the control information for downlink unicast transmission in the obtained control signal to the unicast signal demodulation and decoding unit 108.

The MBMS signal demodulation and decoding unit 106 performs predefined operations on the MBMS channel received from the demultiplexing unit 104 to demodulate and decode the MBMS channel.

The unicast signal demodulation and decoding unit 108 uses the L1/L2 control information associated with downlink unicast transmission from the control signal demodulation and decoding unit 109 to perform predefined operations on the unicast signal received from the demultiplexing unit 104 for demodulation and decoding the unicast signal.

[Frequency Division Multiplexing Communication Method]

Next, a frequency division multiplexing communication method for the MBMS channel and the unicast channel according to the third embodiment of the present invention is described. Initially, in the MBMS signal generation unit 82, MBMS data is modulated in the OFDM, and longer CPs are appended to the modulated OFDM symbols to generate a MBMS channel.

Then, in the unicast signal generation unit 84, unicast data is modulated in the OFDM, and longer CPs are appended to the OFDM symbols to generate a unicast channel.

Then, in the L1/L2 control signal generation unit 85, a L1/L2 control signal such as feedback information for uplink transmission (ACK/NACK, scheduling information, MCS information and so on) and control information for downlink unicast transmission (MCS information, transmission assigned user information and so on) is generated.

Then, the MBMS channel, the unicast channel and the L1/L2 control signal are mapped to generate a transmission signal. Then, predefined operations are performed on the transmission signal, and the resulting signal is transmitted.

According to the third embodiment, the L1/L2 control channel transmitted in a frequency band for transmitting the MBMS channel is transmitted in a frequency band for transmitting the unicast channel. For this reason, symbols for transmitting the L1/L2 control channel in the frequency band for transmitting the MBMS channel can be used to transmit other information, which can utilize radio resources efficiently.

Fourth Embodiment

The fourth embodiment of the present invention is described with reference to FIGS. 11-13.

[Base Station]

Figure 11:
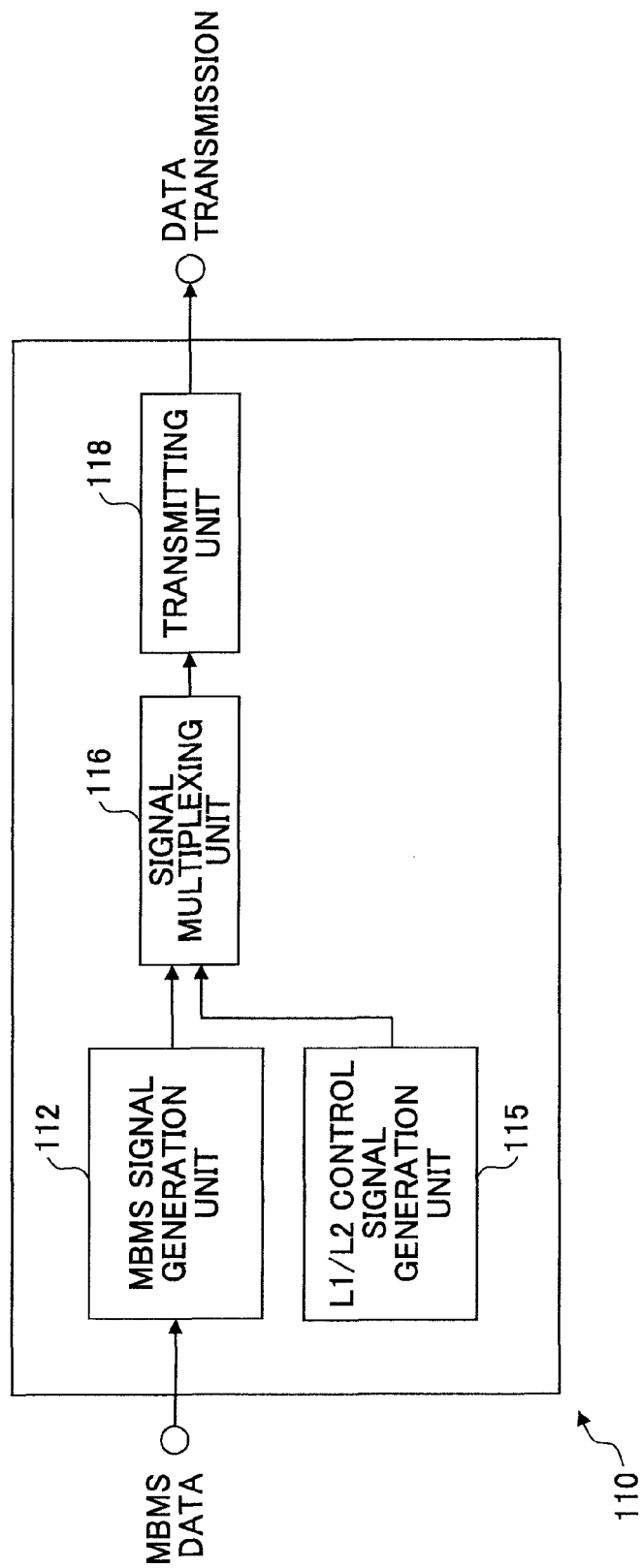
FIG. 11 is a schematic view illustrating an arrangement of a base station according to the fourth embodiment of the present invention.
Figure 12:
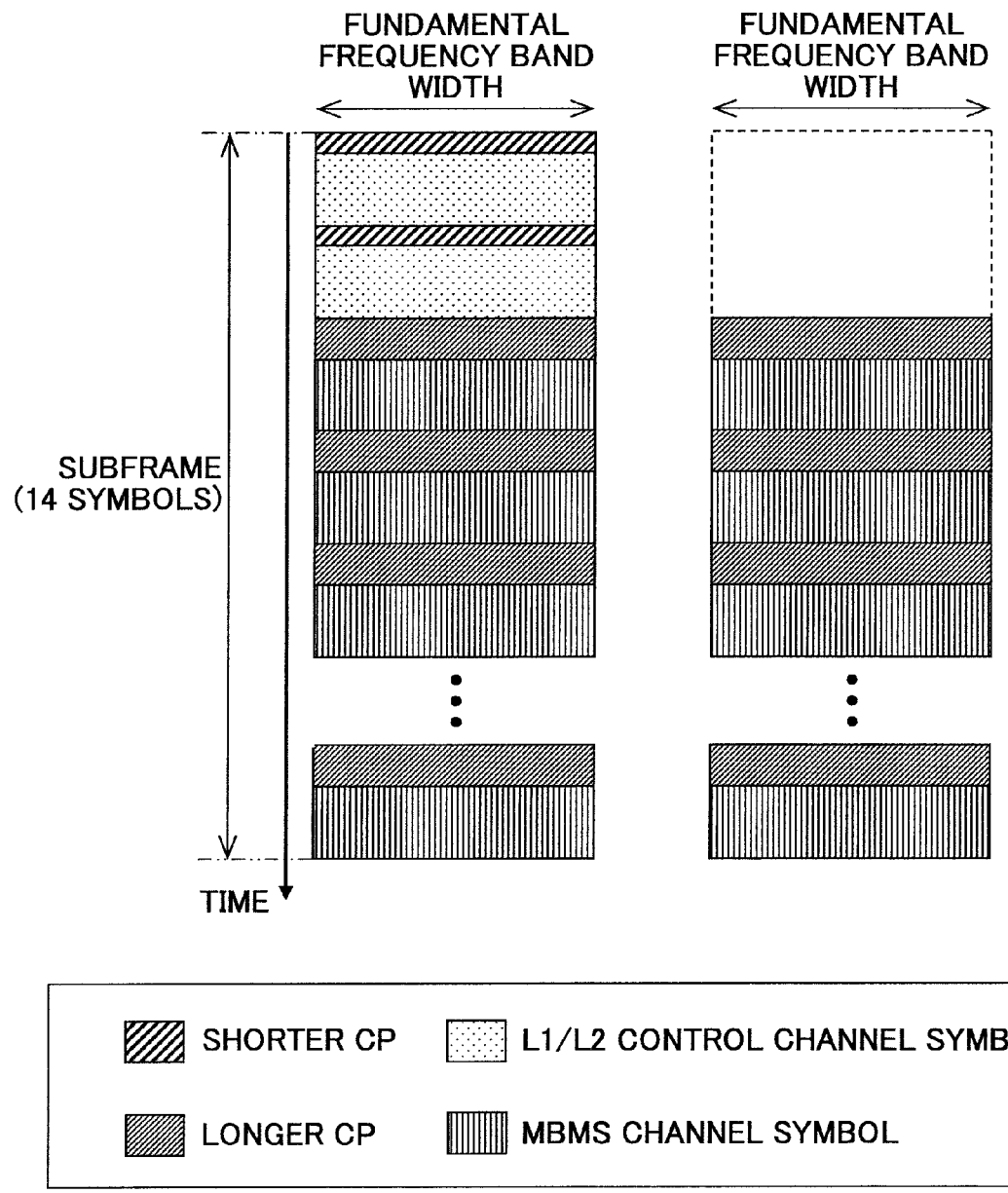
FIG. 12 is a schematic view illustrating exemplary arrangement of the MBMS channels generated at a base station according to the fourth embodiment of the present invention.

FIG. 11 is a schematic view illustrating an arrangement of a base station according to the fourth embodiment of the present invention. As illustrated, a base station 110 includes a MBMS signal generation unit 112, a L1/L2 control signal generation unit 115, a signal multiplexing unit 116 and a transmitting unit 118.

The L1/L2 control signal generation unit 115 generates a L1/L2 control signal such as feedback information for uplink transmission (ACK/NACK, scheduling information, MCS information and so on) and supplies the resulting signal to the signal multiplexing unit 116.

The MBMS signal generation unit 112 modulates MBMS data incoming from a non-illustrated buffer in accordance with the OFDM and generates a MBMS channel by appending CPs to OFDM symbols. Here, the longer CPs are inserted to the MBMS channel.

Also, the MBMS signal generation unit 112 supplies the generated MBMS channel to the signal multiplexing unit 116.

The signal multiplexing unit 116 receives the MBMS channel from the MBMS signal generation unit 112 and a control signal regarding the L1/L2 control information from the L1/L2 control signal generation unit 115. The signal multiplexing unit 116 maps the received channels and signals to generate a transmission signal. FIG. 12 illustrates an exemplary transmission signal. Referring to FIG. 12, a frequency band for transmitting the MBMS channel has the L1/L2 control channel while a portion of the frequency band for transmitting the MBMS channel corresponding to the L1/L2 control channel has no information to be transmitted.

Referring to FIG. 11 again, the signal multiplexing unit 116 supplies the generated transmission signal to the transmitting unit 118. Upon receipt of the transmission signal, the transmitting unit 118 performs predefined operations on the transmission signal and transmits the resulting signal via a non-illustrated antenna.

[Mobile Station]

Figure 13:
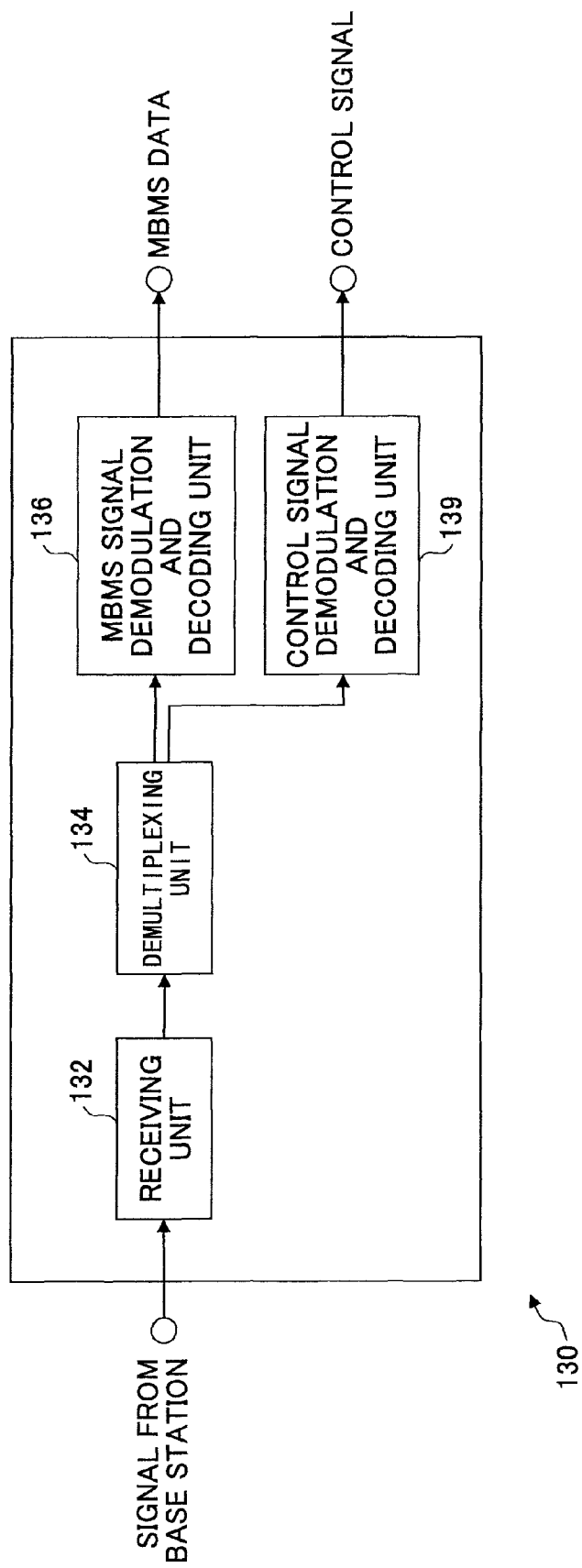
FIG. 13 is a schematic view illustrating an arrangement of a mobile station according to the fourth embodiment of the present invention.

FIG. 13 is a schematic view illustrating an arrangement of a base station according to the fourth embodiment of the present invention. As illustrated, a mobile station 130 includes a receiving unit 132, a demultiplexing unit 134, a MBMS signal demodulation and decoding unit 136 and a control signal demodulation and decoding unit 139.

The receiving unit 132 receives a transmission signal transmitted from the base station 110, performs predefined operations on the received signal and supplies the resulting signal to the demultiplexing unit 134.

The demultiplexing unit 134 demultiplexes the signal incoming from the receiving unit 132 into a MBMS channel and a control signal. Also, the demultiplexing unit 134 supplies the MBMS channel to the MBMS signal demodulation and decoding unit 136 and the control signal to the control signal demodulation and decoding unit 139.

The control signal demodulation and decoding unit 139 obtains information regarding L1/L2 control information from the control signal received from the demultiplexing unit 134.

The MBMS signal demodulation and decoding unit 136 performs predefined operations on the MBMS channel received from the demultiplexing unit 134 to demodulate and decode the MBMS channel.

[Transmission Method]

A MBMS channel transmission method according to the fourth embodiment of the present invention is described.

Initially, it is determined whether a frequency band is for transmitting the L1/L2 control information. If the frequency band is for transmitting the L1/L2 control information, MBMS data and a L1/L2 control channel are modulated in accordance with the OFDM, and CPs are appended to OFDM symbols to generate a MBMS channel. Here, longer CPs are inserted to the MBMS channel, and shorter CPs are inserted to the L1/L2 control channel. On the other hand, if the frequency band is not for transmitting the L1/L2 control information, the MBMS data is modulated in accordance with the OFDM, and longer CPs are appended to OFDM symbols to generate the MBMS channel.

Subsequently, if the MBMS channel and the L1/L2 control channel are present, the mapping is performed on the channels including the L1/L2 control channel to generate a transmission signal. Then, predefined operations are performed on the generated transmission signal, and the resulting signal is transmitted.

The IMT-Advanced allows for utilization of a frequency bandwidth of 100 MHz, but there is a likelihood that this frequency bandwidth of 100 MHz may be the total bandwidth of several frequency bands rather than a continuous frequency bandwidth (so-called frequency aggregation). In this case, the MBMS channel may be transmitted in a 2 GHz band and 3 GHz band, for example. In the base station 110 according to the fourth embodiment, the L1/L2 control signal generation unit 115 specifies frequency bands for transmitting the L1/L2 control channel and accordingly can cause the L1/L2 control channel to be transmitted in the 2 GHz band and not to be transmitted in the 3 GHz band. In this case, a portion in the 3 GHz band corresponding to the L1/L2 control channel can be used to transmit the MBMS data.

Also, there is a case that the MBMS signal is transmitted in two frequency bands in a continuous frequency band of 100 MHz instead of the frequency aggregation. Also in this case, the frequency band for transmitting the L1/L2 control channel is specified, and accordingly a certain frequency band may not be used to transmit the L1/L2 control channel. For this reason, a portion of the current subframe corresponding to the L1/L2 control channel can be instead used to transmit the MBMS data.

In this manner, it is possible to utilize radio resources efficiently and provide services such as fast video streaming smoothly.

Although the present invention has been described with reference some embodiments, the present invention is not limited to the above embodiments, and various modifications and applications can be made in light of the attached claims. For example, in the third embodiment, the longer CPs are inserted to the unicast channel as in the first embodiment. However, as in the second embodiment, shorter CPs may be inserted, and the guard band may be appended in the signal multiplexing unit 86 between the unicast channel and the MBMS channel.

Also, the fourth embodiment may be applied to the third embodiment. In other words, in the third embodiment, the L1/L2 control channel to be transmitted in a frequency band for transmitting the MBMS channel is transmitted in a frequency band for transmitting the unicast channel. However, the L1/L2 control channel may be transmitted not in the frequency band for transmitting the unicast channel but by using one or less than N frequency bands of N frequency bands for transmitting the MBMS channel. As a result, there arises a frequency band for the L1/L2 control channel that does not include information, and the frequency band can be utilized to transmit other information (e.g., MBMS data).

Furthermore, although several frequency division multiplexing communication methods according to embodiments of the present invention have been illustrated, the steps (or procedures) do not have to be conducted in the above-mentioned order. It will be apparently appreciated by those skilled in the art that some of the steps may be conducted in a different order or simultaneously.

Also, it has been described above that the base station, the mobile station and the frequency division multiplexing communication method of the present invention are particularly effective to the IMT-Advanced. However, radio resources can be efficiently utilized not only in the IMT-Advanced but also in the LTE, and accordingly it goes without saying that the embodiments of the present invention may be applied to the LTE system. Furthermore, the so-called MBSFN has been intensively described as the MBMS communication, but even in the case of single cell MBMS, the present invention may be applicable if several channels having inserted CPs of different lengths are multiplexed in the frequency division multiplexing.

LIST OF REFERENCE SYMBOLS 10, 50, 80, 110: base station
12, 112: MBMS signal generation unit
14, 54, 84: unicast signal generation unit
16, 56: FDM multiplexing unit
18, 88, 118: transmitting unit
85, 115: control signal generation unit
30, 100, 130: mobile station
32, 102, 132: receiving unit
34, 104, 134: demultiplexing unit
36, 106, 136: MBMS signal demodulation and decoding unit
38, 108: unicast signal demodulation and decoding unit
109, 139: control signal demodulation and decoding unit

The invention claimed is:

1. A base station comprising:
a multiplexing unit configured to multiplex a first channel and a second channel in accordance with frequency division multiplexing via a guard band such that the first channel and the second channel have a desired frequency bandwidth,
wherein the first channel is for transmitting first data to be transmitted to multiple mobile stations, and the second channel is for transmitting second data to be transmitted to one mobile station,
wherein the multiplexing unit multiplexes an L1/L2 control channel into both a frequency band for transmitting the first channel and a frequency band for transmitting the second channel, and
wherein the first data of the first channel and the second data of the second channel have a cyclic prefix of different length, and L1/L2 control information in the first and second channels has a cyclic prefix of same length.

2. The base station as claimed in claim 1, further comprising:
a first signal generation unit configured to generate the first channel, the first signal generation unit inserting a first cyclic prefix to the first channel including the first data; and
a second signal generation unit configured to generate the second channel, the second signal generation unit inserting a second cyclic prefix to the second channel including the second data.

3. A mobile station for communicating to the base station as claimed in claim 2, comprising:
a demultiplexing unit configured to demultiplex the first channel and the second channel multiplexed in accordance with the frequency division multiplexing.

4. The base station as claimed in claim 1, further comprising:
a third signal generation unit configured to generate the second channel, the third signal generation unit inserting the guard band between the second channel and the first channel.

5. A mobile station for communicating to the base station as claimed in claim 4, comprising:
a demultiplexing unit configured to demultiplex the first channel and the second channel multiplexed in accordance with the frequency division multiplexing.

6. A mobile station for communicating to the base station as claimed in claim 1, comprising:
a demultiplexing unit configured to demultiplex the first channel and the second channel multiplexed in accordance with the frequency division multiplexing.

7. A frequency division multiplexing communication method, comprising the steps of:
generating a first channel for transmitting first data to be transmitted to multiple mobile stations;
generating a second channel for transmitting second data to be transmitted to one mobile station; and
multiplexing the first channel and the second channel in accordance with frequency division multiplexing via a guard band such that the first channel and the second channel have a desired frequency bandwidth,
wherein the multiplexing step comprises multiplexing an L1/L2 control channel into both a frequency band for transmitting the first channel and a frequency band for transmitting the second channel, and
wherein the first data of the first channel and the second data of the second channel have a cyclic prefix of different length, and L1/L2 control information in the first and second channels has a cyclic prefix of same length.

8. The frequency division multiplexing communication method as claimed in claim 7, wherein
the step of generating the first channel comprises inserting a first cyclic prefix to the first channel, and
the step of generating the second channel comprises inserting a second cyclic prefix to the second channel.

9. The frequency division multiplexing communication method as claimed in claim 7, wherein the step of generating the second channel comprises inserting the guard band between the second channel and the first channel.

* * * * *